Sept. 23, 1969      W. MESSINGER      3,468,025

FLEXIBLE SCREEN FOIL

Filed Sept. 9, 1966

Inventor
WERNER MESSINGER

BY McGlew & Toren
ATTORNEYS

United States Patent Office 3,468,025
Patented Sept. 23, 1969

3,468,025
FLEXIBLE SCREEN FOIL
Werner Messinger, Frankfurt am Main, Germany, assignor to Braun Aktiengesellschaft, Frankfurt am Main, Germany
Filed Sept. 9, 1966, Ser. No. 578,231
Claims priority, application Germany, Oct. 22, 1965, B 84,220
Int. Cl. B26b *19/04*
U.S. Cl. 30—346.51
4 Claims

ABSTRACT OF THE DISCLOSURE

A flexible screen foil for dry shaves comprises a central perforated field having an unperforated marginal area around the field. In order to provide a cutting foil surface of great mechanical strength and having high cutting quality, the perforated field is formed with a plurality of holes of substantially uniform size and spacing in a central zone and includes a marginal transition zone around the central zone with holes which are dimensioned progressively smaller toward the outer boundary of the transition zone so that the web portion between the holes becomes wider from the inner boundary of the transition zone towards the outer boundary thereof. The transition zone comprises a very narrow marginal area on one side of the perforated field and a somewhat wider marginal area on each end of the perforated field.

Summary of the invention

This invention relates in general to the construction of shavers and in particular to a new and useful flexible screen foil for dry shavers in which the shearing parts are elastically clamped together.

The present invention is particularly directed to a dry-shaver construction in which a perforated screen foil is clamped on a shaver head frame around a cutter which is elastically biased into cooperation with the screen foil. The construction is such that close contact between the two shearing parts, that is, of the screen foil and the cutter, is always ensured.

The geometric form of a screen foil depends essentially on the design of the shearing head, that is whether it is a long head or a round head and also on the direction of the working movement of the cutters, for example, rotating, swinging, or translatorily oscillating. In all cases, as small as possible a thickness of the foil at least in the zone of the perforated field and as great as possible a clearance ratio, that is the ratio of the useful total of the screen holes to the remaining web surface, is desirable. Both factors are decisive for the depth and duration of the shave, but the screen holes must not be increased beyond a certain optimum measure in order to avoid the possibility of the pushing through of the facial skin to cause facial injuries or damage to the shearing knives.

Observing the above conditions, very good shaving results have been achieved with foils of a thickness of about 50 microns in which screen holes of round, oval or angular contour are nested one in the other so intimately that the webs form only a thin network.

Even with the advances in the refinement of the foil, there have been limits in the types of arrangements of the perforated fields which will provide sufficient mechanical strength. During shaving, the foil is exposed to relatively great external forces which act from alternate directions. These forces are caused by the application of the shearing head against the facial skin, the so-called shaving pressure, and they lead to a continuous deformation of the foil by warping. The warping is produced because the foil is not supported by the lower cutters over its entire surface, but only along one or more lines of contact. In the case of elastic lower cutters, they are not supported over their entire surface, but only along one or more lines of contact so that they can give way to the shaving pressures along with the cutters. The warping of the foil, especially in the transition zone of the perforated field adjacent the unperforated surrounding rim or marginal rim area in which the cross section of the materials changes suddenly, there is frequently a destruction of the foil by pinching or breaking of the thin webs between the screen holes. This renders the foil unusable.

In accordance with the present invention, there is provided a screen foil of particular construction which includes a perforated field with a marginal area or surrounding rim which is unperforated. The perforated field includes marginal outer areas or transition zones which are provided with a hole size or hole spacing such that the screen foil webs between holes are wider than the webs in the perforated field. With such a construction, the cross section of the material does not change suddenly, but gradually from the perforated field outwardly to the completely unperforated rim so that tension peaks are avoided and the foil is able to withstand higher bending stresses.

In arranging the holes in the transition zone of the perforated field so as to provide for widening of the webs, care must be taken that the clearance ratio in the perforated field is not appreciably worsened. It would therefore be undesirable to accomplish the gradual cross sectional enlargement exclusively by singling or omission of some of the holes in the transition zone, that is, by variation of mesh size. While this is sometimes possible, it may lead to an arrangement in which the clearance ratio would become such that it would require too large a foil screen surface. It is more advantageous if at equal mesh size the screen holes are dimensioned increasingly smaller toward the unperforated foil rim. The transitions can thus be limited to narrow peripheral zones of the perforated field in which a poor hole web ratio can be accepted because the area is rarely used for shaving.

In a further development of the invention, the outer peripheral zone of the perforated field in which the webs are made increasingly wider is subdivided into individual sections of different depth. By this measure the screen foil can be better adapted to occurring stresses which will differ depending on the design and clamping of the foil to the housing of the dry shaver. Thus, for example, when rectangular screen foils are clamped in an arched manner to extend around the end of a head frame and be fastened at its ends to the respective opposite sides of the frame, the sections of the peripheral zones lying at the clamped sides of the foil may be lower and hence have a smaller increase of the web width than the bent portions of the peripheral zone where for reasons of a good clearance ratio in the useful perforated field, a smaller depth with greater increase of the web widths is desirable.

Accordingly, it is an object of the invention to provide a shaver having an improved screen foil construction.

A further object of the invention is to provide an improved screen foil construction for a razor which includes a perforated field with a surrounding unperforated marginal rim and wherein the perforated field includes a transition zone extending around the field in which the web portions of the foil are made larger than in the central portion of the field.

A further object of the invention is to provide a screen foil for a dry shaver which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
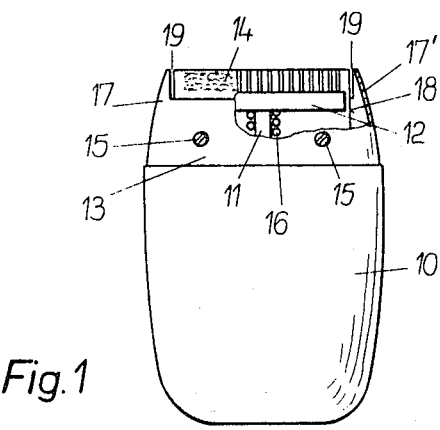
FIG. 1 is a side elevational view, partly in section, of a shaver constructed in accordance with the invention.

Referring to the drawings in particular, the invention embodied therein includes a shaver having a housing 10 in which is located a motor (not shown). The housing 10 carries a removable shearing head frame 13 and a screen foil member 14 is clamped at its opposite ends in respective sides of the head frame 13.

The screen foil 14 is held on the head by means of screw bolts 15. A helical spring 16 is disposed about an oscillatable arm member 11 which is driven from the motor (not shown) and the spring biases a cutter 12 upwardly against the interior of the screen foil 14. As indicated in FIG. 1, the shearing head frame 13 is dimensioned so that between the two cheeks or side portions 17 and 17' of the frame, and the adjacent bent side edges 18 and 18' of the screen foil 14, there is a gap 19. Thus the screen foil 14, together with the cutter 12 can yield under shaving pressure counter to the action of the spring 16 without striking the housing.

Figure 2:
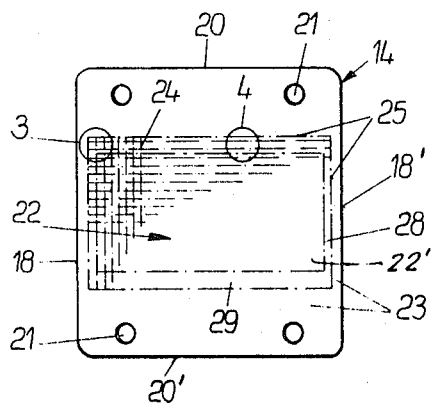
FIG. 2 is a plan view of the screen foil constructed in accordance with the invention.

In FIG. 2 there is indicated the screen foil 14 constructed in accordance with the invention before it has been incorporated in the head frame 13. The screen 14 is in the form of a rectangle and is made up of a thin steel sheet or a galvanically produced nickel foil. Adjacent respective opposite end edges 20 and 20' of the foil there are located openings 21 for the passage of the securing bolts 15.

In accordance with the invention, the screen foil 14 includes a perforated field generally designated 22 which is made up of a central area with uniformly dimensioned holes 26, separated by uniformly dimensioned webs 27. The perforated field 22 is located centrally between respective end edges 20 and 20' and side edges 18 and 18', leaving the surrounding rim 23 with a relatively wide marginal area at each end and a relatively small marginal area at each side which is unperforated. For clarity of illustration purposes, in FIG. 2 only the grid arrangement 24 of the screen lines and the dash-dot limiting lines 25 of the perforated field are shown. The exact arrangement and formation of the screen holes is illustrated in FIG. 3 for the corner area designated 3 in FIG. 2, and variations of the intermediate circle end areas designated 4 in FIG. 2 are illustrated in FIG. 4a and FIG. 4b.

Figures 3, 4A, 4B:
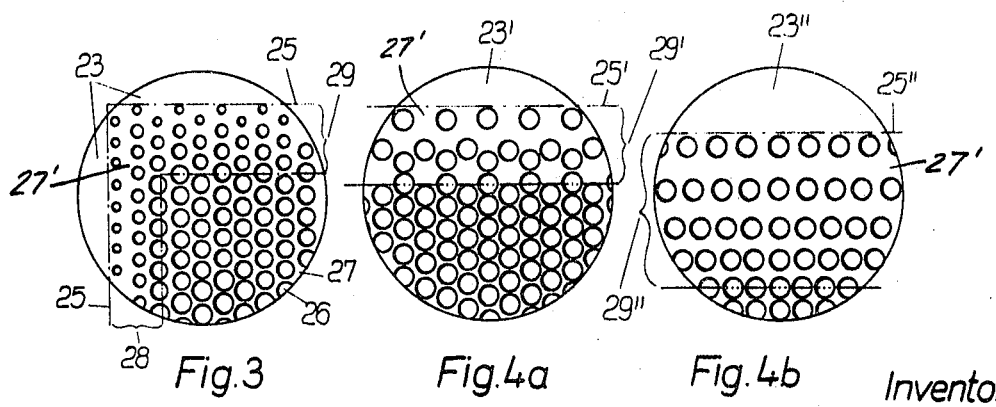
FIG. 3 is an enlarged fragmentary plan view of a portion of the screen foil indicated in FIG. 2.
FIG. 4a is a view similar to FIG. 3 of another embodiment.
FIG. 4b is a view similar to FIG. 4a of still another embodiment of the invention.

In accordance with the embodiment indicated in FIG. 3, the screen holes 26 are closely adjacent with the mesh size being the same size in the central part or zone 22' of the perforated area or field 22. In the central zone of the field 22 all screen holes are of equal diameter and the webs 27 between the holes thus have equal width. In the end peripheral zones or transition zones designated by the numerals 28 and 29, the holes are of a sizing and spacing such that the webs 27' become increasingly wider from the central zone 22' toward the edges 20 and 20' of the foil, and also wider from the central zone 22' toward the sides 18 and 18' of the foil. Thus, basically the foil 14 is made up of a central perforated area in which the holes and the web portions between the holes are of equal size and spacing and transition zones 28 and 29 adjacent the periphery of the perforated field 22 with holes and webs arranged so that there is an increase toward the unperforated area of the size of the web and a reduction of the size or number of holes.

By the gradual increase of the web cross sections in the area of the transition zones 28 and 29, which in the shaving operation is especially subject to bending stresses, the screen foil 14 attains a much higher strength and the breaking of the thin webs at the edge of the perforated field due to the sudden cross sectional variations is avoided. This is accomplished in accordance with the invention without requiring a substantial worsening of the clearance ratios in the perforated field.

The depth of the transition zones 28 and 29 must not necessarily be the same on all sides of the perforated field. For example, it may be greater in the end section 29 which is used very little in shaving operations and which lies at the extreme sides of the head frame 13 than at the adjacent side sections in zone 28 when the foil is clamped in position on the shaver. Thus, in the lower end zones 29, 29 adjacent the ends 20 and 20' respectively of the foil the increase of web widths may either be less than in the side zones or if the increase is the same, the foil may be made with a wider width depending on the stresses which are apt to occur with the selected type of clamping of the foil.

As indicated in FIG. 4a, an increase in web cross section can in principle be achieved by employing holes of equal diameter and mesh size which are singled in the peripheral areas so that some holes are omitted. With such a method, however, the uniform increase of the web cross section is not absolutely ensured. Better results can be obtained when according to FIG. 4b the mesh size in the peripheral zone is varied using equal hole diameter. This latter method, however, is advisable only when a greater depth of the transition zone 29 is acceptable as is readily evident from a comparison of the depth of the peripheral zones 29 in FIG. 3, zone 29' in FIG. 4a, and 29'' in FIG. 4b. Sometimes it is advantageous to combine the variants shown in FIGS. 3, 4a and 4b by using variations of hole size and spacing and web size in various sections of the transition zone or zones of the perforated field. The foil need not necessarily be a rectangular screen foil, but may be round or oval with, for example, round or oval perforations.

What is claimed is:

1. A flexible screen foil for dry shavers having shearing parts which are arranged in elastically clamped relationship, comprising a screen foil having a perforated field with an unperforated marginal area around the field, said perforated field being formed by a plurality of holes through the foil with webs between the holes, the holes in the central zone of the perforated field being of substantially uniform size and spacing and the holes in a transition zone, extending completely around the central zone, being dimensioned progressively smaller toward the outer boundary of the transition zone, the webs between the holes in the transition zone becoming wider from the inner boundary of the transition zone toward the outer boundary thereof.

2. A screen foil according to claim 1, wherein the transition zone includes marginal end areas of a different dimension than marginal side areas.

3. A screen foil according to claim 2, wherein the marginal end areas are of greater length than the marginal side areas.

4. A flexible screen foil according to claim 1, wherein the centers of the holes in the transition zone are uniformly spaced.

(References on following page)

References Cited

UNITED STATES PATENTS

| | | | |
|---|---|---|---|
| 2,267,626 | 12/1941 | Stainbrook | 30—346.51 X |
| 2,323,881 | 7/1943 | Mehl | 30—346.51 X |
| 2,341,833 | 2/1944 | Volz | 30—346.51 X |
| 2,345,263 | 3/1944 | Jepson | 30—346.51 X |
| 2,616,170 | 11/1952 | Keblusek | 30—346.51 X |

FOREIGN PATENTS

| | | |
|---|---|---|
| 947,023 | 1/1949 | France. |
| 1,129,017 | 3/1956 | France. |
| 1,034,511 | 7/1958 | Germany. |

MYRON C. KRUSE, Primary Examiner

U.S. Cl. X.R.

29—183